United States Patent
Haas

(10) Patent No.: US 8,490,205 B2
(45) Date of Patent: Jul. 16, 2013

(54) METHOD FOR PROTECTING SIGNATURES STORED IN A DATABASE

(75) Inventor: Bertrand Haas, New Haven, CT (US)

(73) Assignee: Pitney Bowes Inc., Stamford, CT (US)

( * ) Notice: Subject to any disclaimer, the term of this patent is extended or adjusted under 35 U.S.C. 154(b) by 1283 days.

(21) Appl. No.: 12/198,262

(22) Filed: Aug. 26, 2008

(65) Prior Publication Data

US 2010/0058483 A1    Mar. 4, 2010

(51) Int. Cl.
*G06F 21/00*  (2006.01)

(52) U.S. Cl.
USPC ............... 726/27; 705/12; 705/64; 713/186; 348/42; 235/386

(58) Field of Classification Search
USPC ........................................................ 726/27
See application file for complete search history.

(56) References Cited

U.S. PATENT DOCUMENTS

| | | | | |
|---|---|---|---|---|
| 6,760,483 | B1 * | 7/2004 | Elichai et al. | 382/241 |
| 7,999,844 | B2 * | 8/2011 | Richards | 348/42 |
| 2001/0022558 | A1 * | 9/2001 | Karr et al. | 342/450 |
| 2003/0059117 | A1 * | 3/2003 | Iwasa et al. | 382/224 |
| 2005/0114667 | A1 * | 5/2005 | Haas | 713/176 |
| 2006/0169778 | A1 * | 8/2006 | Chung | 235/386 |
| 2007/0132733 | A1 * | 6/2007 | Ram | 345/163 |
| 2007/0147929 | A1 * | 6/2007 | Ishimoto et al. | 400/62 |
| 2007/0165208 | A1 * | 7/2007 | Cowburn et al. | 356/71 |
| 2007/0170253 | A1 * | 7/2007 | Chung et al. | 235/386 |
| 2009/0146961 | A1 * | 6/2009 | Cheung et al. | 345/172 |

OTHER PUBLICATIONS

Secure E-Voting With Blind Signature| http://ieeexplore.ieee.org/stamp/stamp.jsp?tp=&arnumber=1188334|Ibrahim et al.| 2003.*
Signature verification using shape descriptors|http://ieeexplore.ieee.org/stamp/stamp.jsp?tp=&arnumber=647344|Dehghan et al.|1995.*
Fast Polygon Mesh Querying by Example| http://research.microsoft.com/pubs/132410/gainscott_siggraph99.pdf| Finkelstein et al.| 1995.*

* cited by examiner

*Primary Examiner* — Taghi Arani
*Assistant Examiner* — Mahfuzur Rahman
(74) *Attorney, Agent, or Firm* — Brian A. Lemm; Charles R. Malandra, Jr.; Steven J. Shapiro

(57) ABSTRACT

A method of protecting the privacy of a signature that may be used in, for example, a vote by mail system, that includes creating a distorted version of the registration signature, storing the distorted version of the registration signature, and storing a mechanism for converting the distorted registration signature into an undistorted registration signature. The stored mechanism may later be used to reverse the distortion so that the undistorted signature can be used in a verification process.

4 Claims, 6 Drawing Sheets

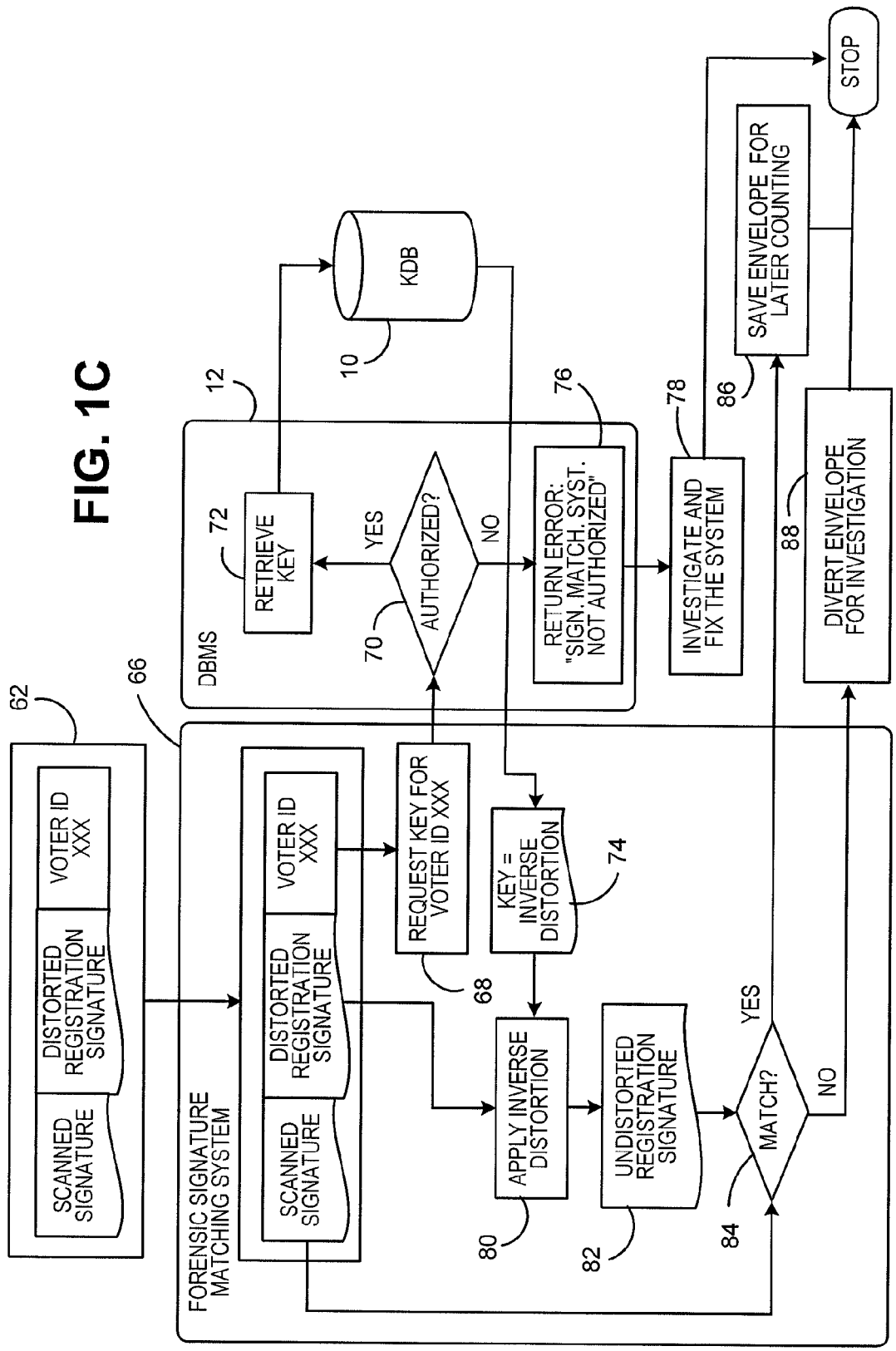

METHOD FOR PROTECTING SIGNATURES STORED IN A DATABASE

FIELD OF THE INVENTION

The present invention relates to databases that store signatures, such as voter registration databases used in vote by mail systems, and in particular relates to methods for protecting the privacy of such signatures.

BACKGROUND OF THE INVENTION

In democratic countries, governmental officials are chosen by the citizens in an election. Conducting an election and voting for candidates for public office can be performed in several different ways. One such way utilizes mechanical voting machines at predetermined polling places. When potential voters enter the predetermined polling place, voting personnel verify that each voter is properly registered in that voting district and that they have not already voted in that election. Thus, for a voter to cast his vote, he or she must go to the polling place at which he or she is registered, based on the voter's residence.

Another method for conducting an election and voting utilizes paper ballots that are mailed to the voters. Each voter wishing to cast a vote marks the ballot and returns the ballot to the voting authority running the election through the mail. In the usual vote by mail process, the voter marks the ballot to cast his/her vote and then inserts the ballot in a return envelope which is typically pre-addressed to the voter registrar's office in the corresponding county, town or locality in which the voter is registered. The voter also appends his/her signature on the back of the envelope adjacent to a voter identification (see below), such as a voter ID number, that is assigned to the voter. The voter identification may be preprinted on the return envelope in human or machine readable (e.g., barcode) form.

In a typical vote by mail system, the voting authority maintains a voter database that includes at least the name, mailing address, voter identification, and registration signature (in the form of an electronic image) of each registered voter. The envelopes including completed ballots that are returned to the registrar's office undergo two separate processes. The first process is an authentication process in which the signature of the voter provided on the return envelope is verified against his or her registration signature that is stored in the voter database. If the signatures match, the return envelope including the completed ballot is stored for later counting. If the signatures do not match, or if the signature is missing from the return envelope, an investigation is commenced during which the registrar normally contacts the voter. The second process occurs at the closing of the election and consists of the counting of the votes from all of the ballots that have been received in return envelopes that have been authenticated as just described.

Currently, the first (authentication) process just described is performed for each returned envelope as follows: (i) the signature on the envelope is scanned, (ii) the voter identification is obtained from the envelope (for example, if the voter identification is in barcode form, the barcode is read using a barcode reader), (iii) the registration signature image associated with the obtained voter identification is retrieved from the voter database using the voter identification, and (iv) the voter identification, the scanned signature image and the retrieved registration signature image are stored for matching purposes. Then each image pair is passed through a signature matching software application (an example of such software is currently offered by Parascript, LLC of Boulder, Colo.) to identify matched pairs and unmatched pairs. The parameters of the signature matching software application are typically adjusted so that the number of false positives (i.e., pairs identified as matching that should not have been so identified) is minimized. The envelopes corresponding to the matched pairs are sorted into an "open and count" pile, while the unmatched pairs are displayed on a computer screen so that they can be examined by a human operator and separated into the following groups: (i) grossly (obviously) unmatching signatures, for which the corresponding envelopes are diverted to a "fraud investigation" pile, (ii) signatures deemed to match based on human inspection, for which the corresponding envelopes are diverted to the "open and count" pile, and (iii) questionable signatures that look similar, but not enough to be deemed matching at this stage (the signature from the envelope may look like an attempt at imitating the stored signature), for which the corresponding envelopes are diverted to a "forensic" pile for more thorough examination.

A problem with the above systems is that the name and mailing address stored in the voter database are semi-public. This situation alone is typically not a cause for concern. However, when coupled with the individual's signature, that information becomes private and sensitive because in combination it can be used to impersonate the individual. Thus, if the voter database without the signatures is compromised, it presents a mild problem, but if the voter database with the signatures is compromised, it presents a significant problem. It would be desirable, therefore, to be able to protect the signatures of voters that are stored in the voter registration database.

SUMMARY OF THE INVENTION

In one embodiment, the invention provides a method of protecting the privacy of a registration signature that includes distorting the registration signature, storing the distorted version of the registration signature, and storing a mechanism for converting the distorted registration signature into an undistorted registration signature. The method may further include steps of authenticating an obtained signature by: obtaining the distorted registration signature; obtaining the mechanism, converting the distorted registration signature into an undistorted registration signature using the mechanism, and comparing the undistorted registration signature to the obtained signature.

Preferably, the converting and the comparing are performed by a first signature matching system employing a first signature matching software application. In this embodiment, the method may further include displaying the obtained signature and the distorted registration signature if the comparing determines that the undistorted registration signature and the obtained signature do not match, and visually determining whether the obtained signature matches the distorted registration signature. The method may still further include providing the obtained signature and the distorted registration signature to a second signature matching system employing a second signature matching software application if the visually determining determines that the distorted registration signature and the obtained signature do not match, and employing the second signature matching system to obtain the mechanism, convert the distorted registration signature into the undistorted registration signature using the mechanism, and compare the undistorted registration signature to the obtained signature.

The distorting may comprise placing a mesh over the electronic image and deforming the mesh, wherein the mechanism comprises the deformed mesh. Alternatively, the distorting may comprise applying a mathematical transformation to the electronic image based on one or more parameters, wherein the mechanism comprises the one or more parameters.

In one particular embodiment, the invention provides a method of conducting a vote by mail election that protects the privacy of a registration signature of a registered voter provided when the voter registers to vote. The method includes distorting the registration signature, storing the distorted registration signature, and storing a mechanism for converting the distorted registration signature into an undistorted registration signature, preferably in a different location than the distorted registration signature. The method may further include receiving a returned envelope including a completed ballot from a registered voter and obtaining a signature from the returned envelope. In addition, the method in this embodiment may still further include obtaining the distorted registration signature that is associated with the registered voter, obtaining the mechanism for converting the distorted registration signature, converting the distorted registration signature that is associated with the registered voter into a corresponding undistorted registration signature using the mechanism, comparing the undistorted registration signature to the obtained signature to determine whether the obtained signature matches the undistorted registration signature, and determining that the returned envelope and the completed ballot are authentic and should be counted in the vote by mail election if it is determined that the obtained signature matches the undistorted registration signature.

Preferably, the converting and the comparing are performed by a first signature matching system employing a first signature matching software application. In this preferred embodiment, the method further includes displaying the obtained signature and the distorted registration signature that is associated with the registered voter if the comparing determines that the obtained signature does not match the undistorted registration signature, visually determining whether the obtained signature matches the distorted registration signature associated with the registered voter, providing the obtained signature and the distorted registration signature that is associated with the registered voter to a second signature matching system employing a second signature matching software application if the visually determining determines that no match exists, and employing the second signature matching system to obtain the mechanism for converting the distorted registration signature that is associated with the registered voter, convert the distorted registration signature that is associated with the registered voter into an undistorted registration signature using the mechanism, and compare the undistorted registration signature to the obtained signature.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIGS. 1A-1C are schematic diagrams illustrating one embodiment of the present invention as implemented in a vote by mail system.

DESCRIPTION OF THE PREFERRED EMBODIMENTS

The present invention provides a method of protecting the privacy of registration signatures (sometimes also referred to as reference signatures) stored in a database by storing the signatures in a distorted form. The nature of the distortion keeps the signature recognizable when compared to a current (non-distorted) version of the signature by the human eye so that comparisons between the two can still be made. However, the nature of the distortion is such that it makes the stored distorted signature virtually useless for impersonation purposes (i.e., not useful to a fraudster who wants to forge the signature). The method removes the sensitivity of the database to identity theft, while at the same time keeping enough information to reveal to the human eye when a signature is grossly different from the original. For illustrative purposes, the present invention will be described in connection with a vote by mail system. It should be understood, however, that the invention is not limited to use in voting systems, but instead may be employed in any situation or application wherein signatures need to be stored in a database for use in, for example, a verification process.

Figure 1A:
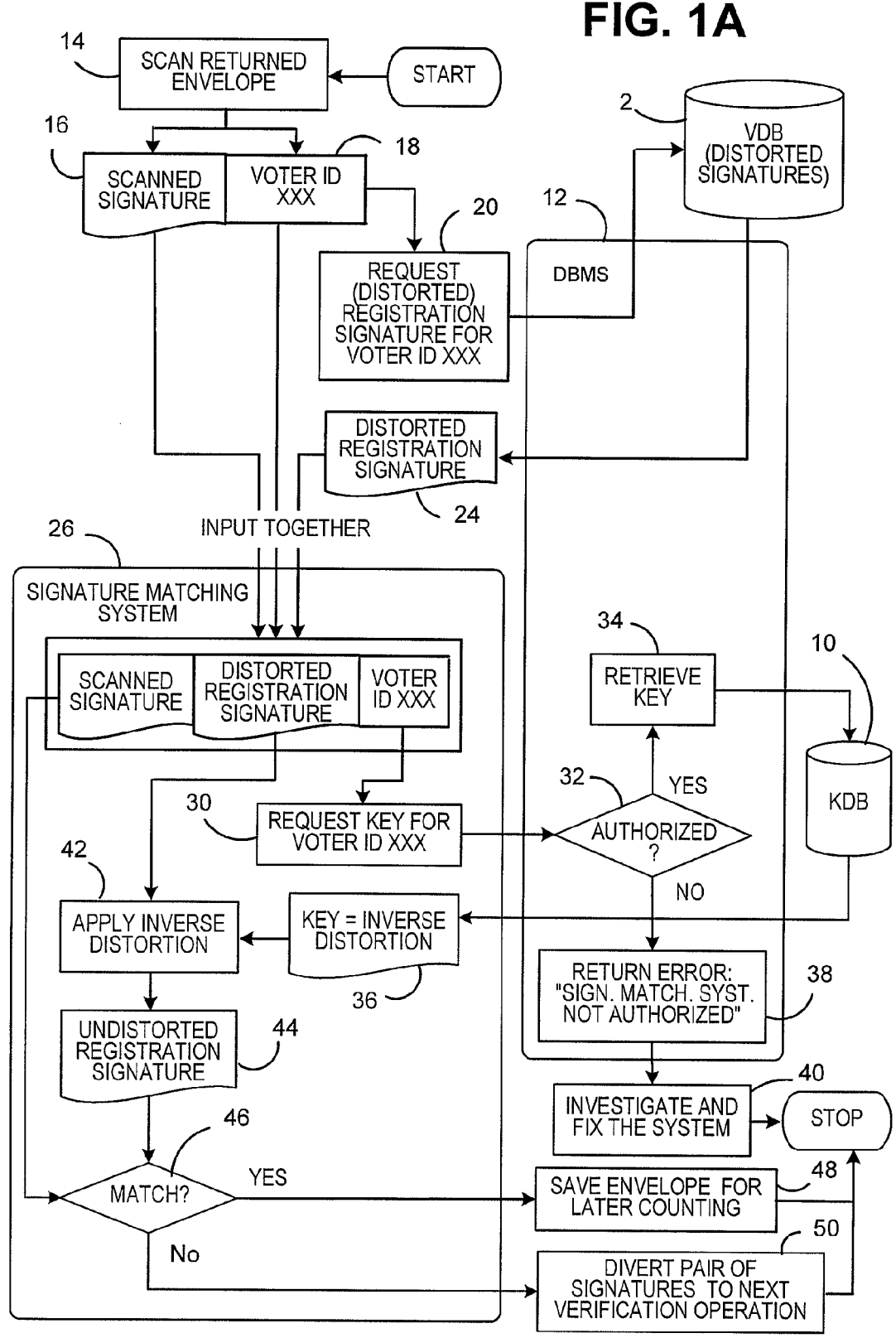
Figure 1B:
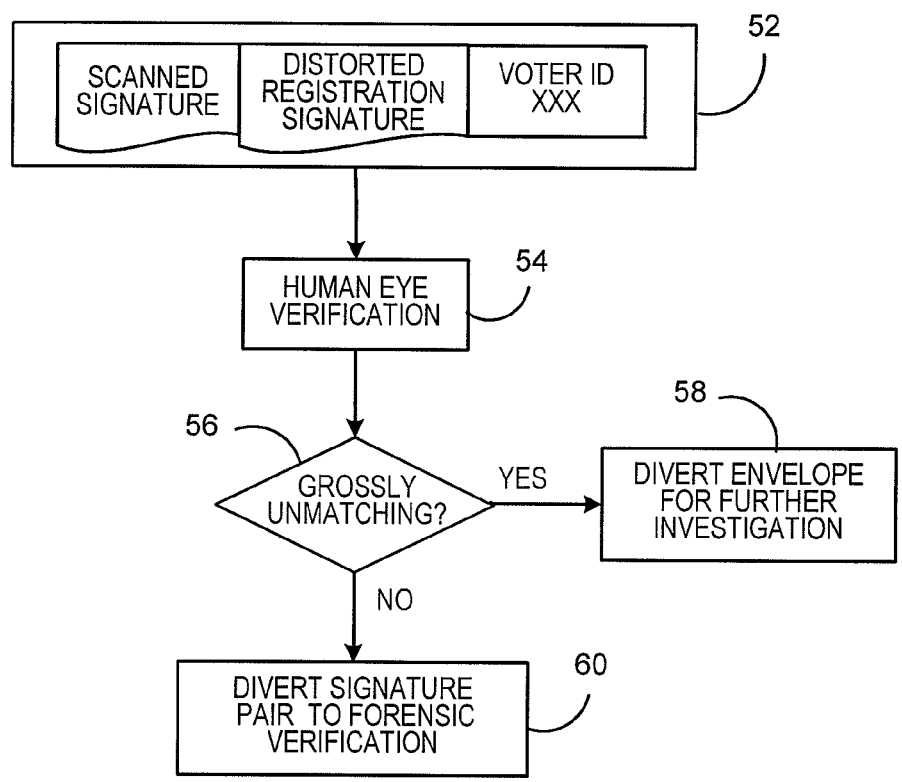

FIGS. 1A-1C are schematic diagrams illustrating one embodiment of the present invention as implemented in a vote by mail system having a number of registered voters. Referring to FIG. 1A, an image of the registration signature of each registered voter is first distorted and stored in a voter database (VDB) 2. Each distorted registration signature is stored in association with the voter identification of the registered voter and, preferably, also in association with the registered voter's name and mailing address. According to an aspect of the invention, the significance of which is described below, each registration signature is distorted in a manner that may be readily inverted (i.e., to reverse the distortion) to obtain the undistorted registration signature.

Figure 2:
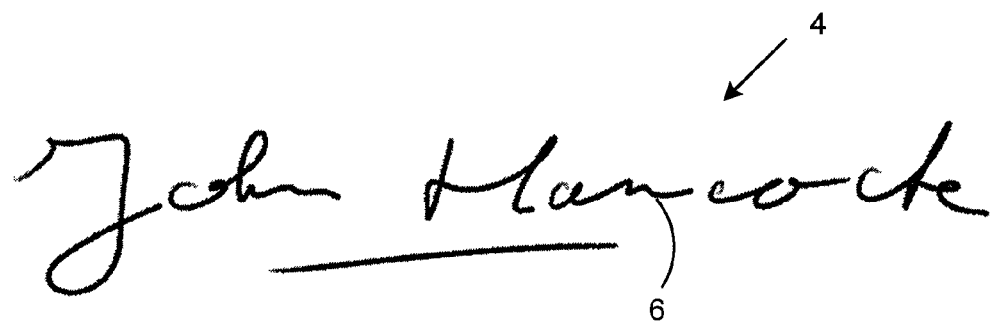
FIGS. 2-6 are schematic illustrations demonstrating how a signature may be distorted using a mesh technique according to one particular embodiment of the invention.
Figure 3:
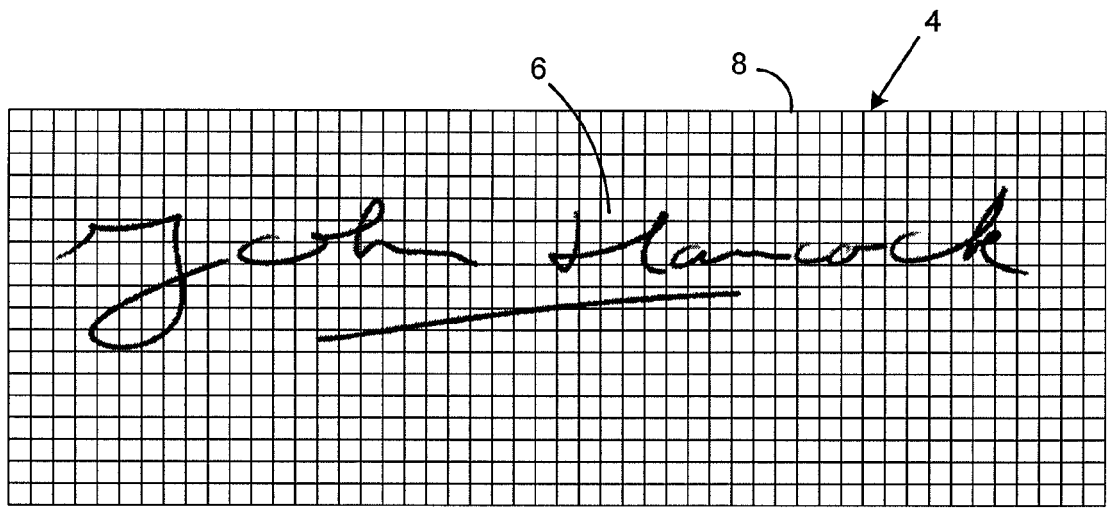
Figure 4:
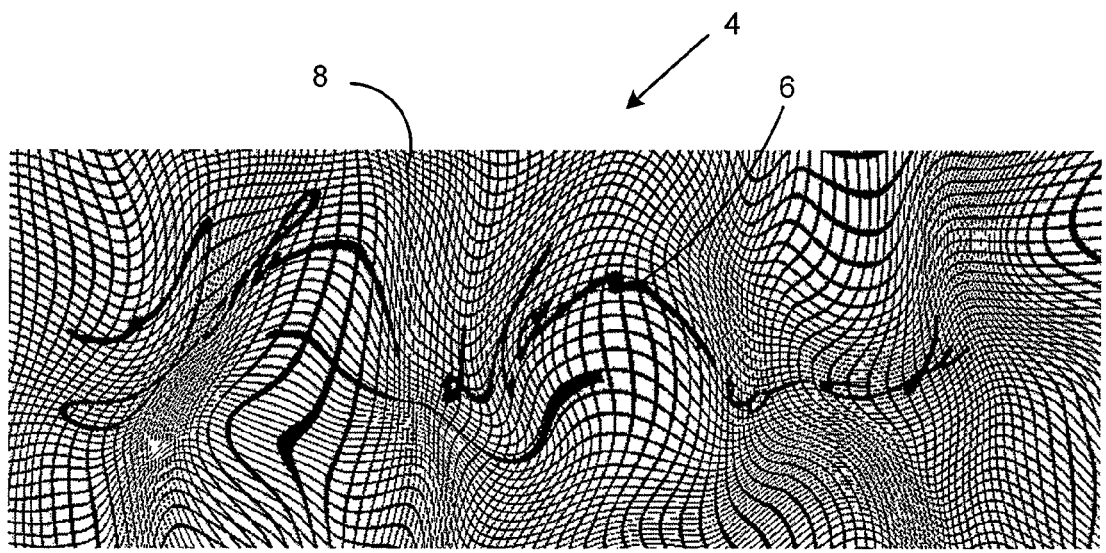
Figure 5:
Figure 6:
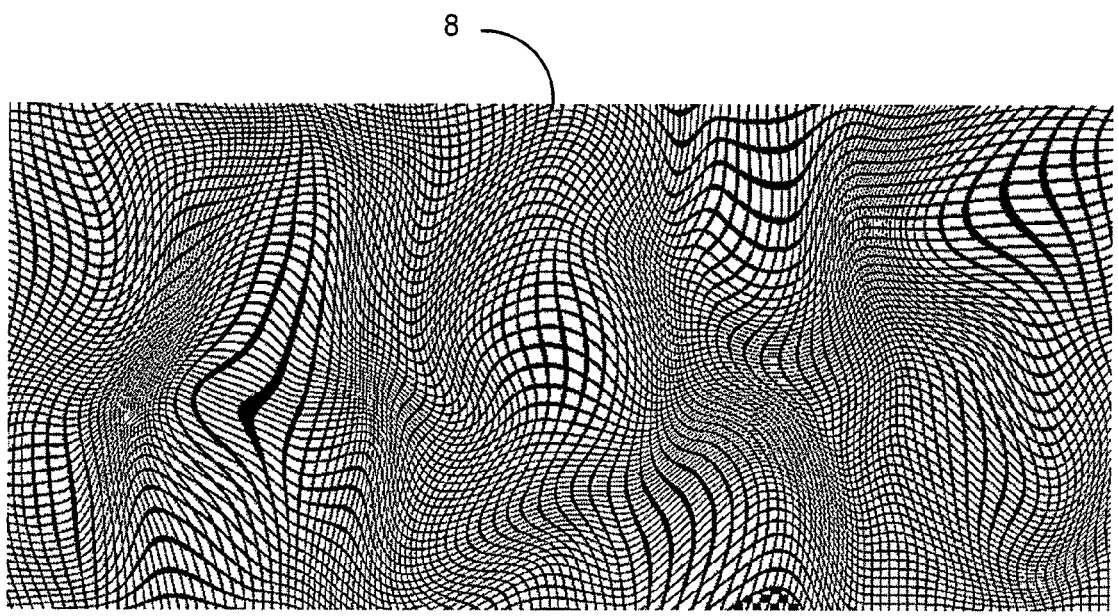

There are numerous ways in which each registration signature may be distorted in a manner that is readily inverted. One such method that may be employed in one particular embodiment of the present invention is demonstrated in FIGS. 2-6 and employs a deformable mesh technique to invertably distort the image of each registration signature. Specifically, FIG. 2 shows an image 4 of an original registration signature 6. In order to distort the image 4 and thus the original registration signature 6, a straight mesh 8 (i.e., a straight grid) is first placed over the image 4 as shown in FIG. 3. Then, the mesh 8 is deformed as shown in FIG. 4, which causes the image 4 to similarly be deformed. As a result, when the mesh 8 is removed, the registration signature 6 will appear in a distorted form as shown in FIG. 5. In addition, the deformed mesh 8 itself as shown in FIG. 6 is independently (i.e., apart from the distorted signature) saved in a separate file so that it may later be used to invert the distortion and change the distorted image 4 and distorted registration signature 6 shown in FIG. 5 back into the original image 4 and the original registration signature 6 shown in FIG. 2. In particular, to perform the inversion, the deformed mesh 8 from the separately saved file is placed over the distorted image 4, and the deformed mesh 8 is then straightened (i.e., returned to a straight grid as shown in FIG. 3), with the result being that the distortion of image 4 and the registration signature 6 is reversed/removed. A deformable mesh technique as just described may be performed using, for example and without limitation, the "Liquify Filter" functionality provided as part of Adobe® Photoshop®. It will be appreciated that other image editing software applications may also be used to implement such a technique.

The nature and extent of distortion of the mesh 8 can be chosen randomly, or, alternatively, can be targeted to the registration signature 6 by, for example, putting more emphasis on enlarging portions of the registration signature 6 that are small and subtle (e.g., the letters "n" and "m") and shrinking portions of the registration signature 6 that are large (e.g., large loops that are present as part of one or more of the letters). In addition, the nature and extent of the distortion is preferably mild enough so that the registration signature 6 can still be recognized (for use in performing comparisons as described elsewhere herein), while at the same time being strong enough so that the distorted registration signature 6 cannot be used in place of the real signature. More precisely, the distorted registration signature 6 is preferably distorted to an extent that would result in it being classified as "unmatching" when compared to the original registration signature 6 using a signature matching software application as described elsewhere herein.

As noted above, other ways of deforming the image 4 and thus the registration signature 6 may also be employed in order to implement the present invention. For example, and without limitation, a mathematical transformation may be applied to the image 4 with several parameters of the transformation being chosen at random for each registration signature 6 and stored for later use in inverting the transformation. Analytic transformations which transform the complex plane of the image 4 are an example of one type of suitable mathematical transformation that may be employed.

According to a further aspect of the embodiment shown in FIGS. 1A-1C, the mechanism or key that may be used to invert the distorted version of each image 4 (for example the particular stored mesh 8 or the particular mathematical transformation parameters) is stored in a key database (KDB) 10. Each such mechanism or key is stored in association with the voter identification of the registered voter whose registration signature 6 was distorted using the mechanism or key. As will be appreciated, a different mechanism or key may be used to distort each image 4 or different groups of images 4, or alternatively, the same mechanism or key may be used to distort each of the images 4. Furthermore, as seen in FIG. 1A, the embodiment shown therein employs a database management system (DBMS) 12 which controls access to the voter database 2 and the key database 10. In particular, the voter database 2 is semi-public, with access thereto being provided to personnel of the voting authority in order to enable such personnel to perform the examinations described herein. In contrast, access to the key database 10 is restricted to the signature matching software applications employed in the embodiment as described elsewhere herein. While the key database 10 and voter database 2 are preferably separate databases, they need not be and can be the same database having multiple storage locations that have different levels of access as described above.

As noted above, FIGS. 1A-1C are schematic diagrams illustrating one embodiment of the present invention as implemented in a vote by mail system, and in particular those Figures illustrate a method by which envelopes containing completed ballots which are returned by mail to the voting registrar's office are authenticated based on signature comparisons. As will be appreciated, the method shown is repeated for each returned envelope that is received.

Referring first to FIG. 1A, as illustrated at 14, 16 and 18, the returned envelope is scanned in order to obtain an image of the signature provided thereon and in order to obtain the voter identification provided thereon. As noted elsewhere herein, the voter identification for each registered voter may be preprinted on the returned envelope in the form of a barcode, in which case the scanning step would include reading the barcode using the barcode reader. As illustrated at 20, a request is made through the database management system 12 to the voter database 2 for the distorted registration signature that corresponds to the obtained voter identification. When, as illustrated at 24, the distorted registration signature image is received from the voter database 2, the distorted voter registration signature image, the voter identification, and the signature image obtained by scanning the returned envelope are input together into a signature matching system 26 comprising a suitable signature matching software application as described elsewhere herein implemented on a suitable computer system. The signature matching system 26 is preferably an automated system that operates the signature matching software application that will provide a simple judgment as to whether or not a pair of signatures match or not. Next, as illustrated at 30, the signature matching system 26 makes a request through the database management system 12 for the key stored in the key database 10 that corresponds to the received voter identification. As shown at 32, the database management system 12 determines whether or not the request is authorized. If the request is determined to be authorized, then, as shown at 34 and 36, the appropriate key is retrieved from the key database 10 and returned to the signature matching system 26. As shown at 38 and 40, if the request is determined to not be authorized, an error signal is generated and an investigation of a possible system problem is initiated.

After the key, which is the mechanism used for the distortion (e.g., the stored distorted mesh or transformation parameters), is returned to the signature matching system 26, the signature matching system 26, as illustrated at 42, applies the key to the distorted registration signature in order to invert the distortion as shown at 44. Next, as shown at 46, the undistorted registration signature is compared to the signature that was obtained from the returned envelope. As shown at 48, if a match is determined to exist, then that returned envelope is saved for later counting. If, however, the signatures are determined to not match, then the distorted registration signature and the obtained signature (i.e., the images including those signatures) are, as shown at 50, diverted for further processing in accordance with the method illustrated in FIG. 1B. In addition, the undistorted registration signature that was generated is, for privacy purposes, preferably erased from the signature matching system 26.

Referring to FIG. 1B, as illustrated at 52, the scanned signature, the distorted registration signature and the voter identification is, in the case where no match is determined to exist by the signature matching system 26, received by a computer system operated by an authorized employee of the voting authority. At 54, both the obtained signature and the distorted registration signature are displayed on the computer system for visual examination and verification by the employee. As shown at 56, a determination is made as to whether or not the displayed signatures are deemed grossly unmatching by the employee. If the answer is yes, then, as shown at 58, the returned envelope is diverted for further investigation. If, however, the signatures are not determined to be grossly unmatching, then, as shown at 60, the signature pair is diverted for further forensic verification as illustrated in FIG. 1C.

Referring to FIG. 1C, as shown at 62, the scanned signature, distorted registration signature and corresponding voter identification diverted as shown at 60 in FIG. 1B are provided to a forensic signature matching system 66 comprising a forensic signature matching software application implemented on a suitable computer system. The forensic signature matching system is preferably a much more robust signature matching system than the system 26 as described in FIG. 1A, and utilizes additional human involvement in making decisions at several stages, along with different image processing techniques, all of which adds to the cost and complexity. Next, the forensic signature matching system 66, through the database management system 12, requests the key from the key database that corresponds to the received voter identification as shown at 68. As illustrated at 70, the database management system 12 determines whether the request is authorized. As illustrated at 72 and 74, if the request is authorized, the database management system 12 will access the appropriate key from the key database 10 and provide it to the forensic signature matching system 66. If the request is not authorized, then, as shown at 76 and 78, an error signal is generated and an investigation into possible problems with the system is initiated.

As illustrated at 80 and 82, upon receiving the key from the key database 10, the forensic signature matching system 66 applies the key to the distorted registration signature in order to reverse the distortion. Then, as shown at 84, the forensic signature software matching application determines whether the obtained signature matches the undistorted registration signature. If the signatures are determined to match, then, as shown at 86, the returned envelope is put aside for later counting. If, however, the signatures are determined by the forensic signature matching system 66 to not match, the returned envelope is diverted for later investigation by election officials as shown at 88.

Thus, the present invention provides a method in which signatures may be stored in a database in a manner which protects the privacy of the signatures while still allowing the stored signatures to be used for signature verification purposes.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of conducting a vote by mail election that protects the privacy of a registration signature of a registered voter, comprising:
   receiving a returned envelope including a completed ballot from the registered voter, the return envelope including a voter's signature;
   obtaining, by a processing device, the voter's signature from the returned envelope;
   obtaining, by the processing device from a first storage location, a distorted version of the registration signature that is associated with the registered voter, the registration signature being previously distorted by placing a mesh over an image of the registration signature and deforming the mesh to create the distorted version of the registration signature and a deformed mesh;
   obtaining, by the processing device from a second storage location that is different than the first storage location, the deformed mesh used to distort the registration signature for the registered voter based on an identification of the registered voter;
   converting, by the processing device, the distorted registration signature into a corresponding undistorted signature using the deformed mesh;
   comparing, by the processing device, the undistorted signature to the voter's signature obtained from the returned envelope to determine whether the undistorted signature matches the obtained voter's signature using a first signature matching software application; and
   determining, by the processing device, that the returned envelope and the completed ballot are authentic and should be counted in the election when the obtained voter's signature matches the undistorted signature.

2. The method according to claim 1, further comprising displaying, by the computer system, the obtained voter's signature and the distorted registration signature when the obtained signature does not match the undistorted signature.

3. The method according to claim 2, further comprising visually determining whether the obtained voter's signature matches the distorted registration signature that is associated with the registered voter.

4. The method according to claim 3, further comprising providing the obtained voter's signature and the distorted registration signature that is associated with the registered voter to a signature matching system employing a second signature matching software application and employing the nature signature matching system to convert the distorted registration signature into a second undistorted signature using the deformed mesh, and compare the second undistorted signature to the obtained voter's signature.

* * * * *